Oct. 10, 1944.  E. K. METZNER  2,359,929
PROCESS AND APPARATUS FOR THE TREATMENT OF FRUIT POMACE
Filed Dec. 23, 1941
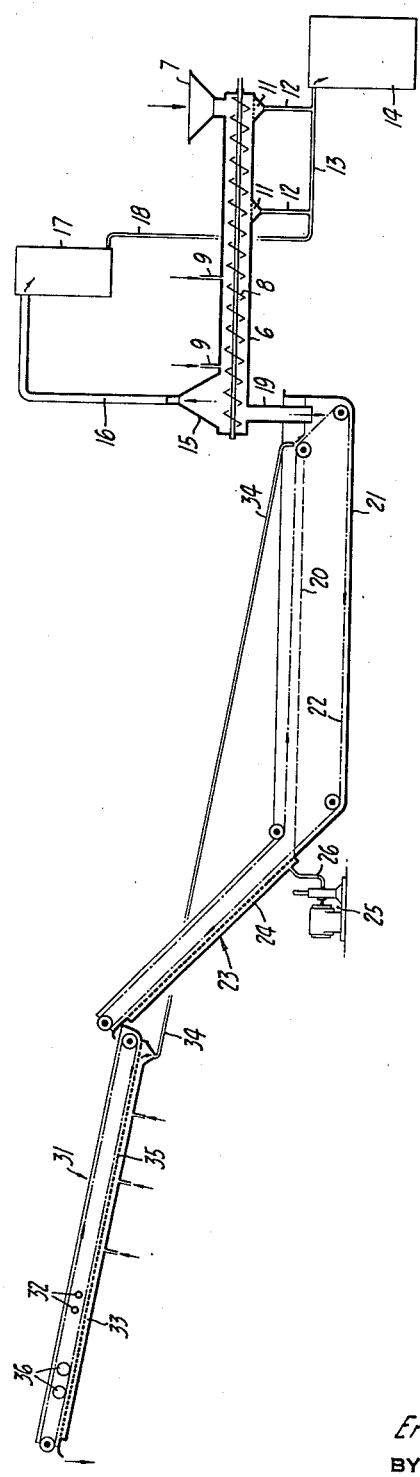
INVENTOR
Ernest Kurt Metzner
BY Robert N. Eckhoff
ATTORNEY Patented Oct. 10, 1944

2,359,929

UNITED STATES PATENT OFFICE 2,359,929

PROCESS AND APPARATUS FOR THE TREATMENT OF FRUIT POMACE

Ernest Kurt Metzner, Cloverdale, Calif., assignor, by mesne assignments, to Stauffer Chemical Company, a corporation of California Application December 23, 1941, Serial No. 424,161

2 Claims. (Cl. 260—536)

This invention relates to the recovery from pomace of the ethyl alcohol and tartrate values therein. A considerable number of patents have been issued heretofore on the batch recovery from pomace of tartrate values therein. So far as I am aware none of these have been in use for a long time.

The reason usually given why no attempt has been made to recover the tartrate values or the alcohol from the pomace is that the recoverable quantities in the pomace and the actual recoveries are too low to support the capital investment and operating costs. I have found that by operating on a continuous basis relatively high percentage recoveries can be secured at low cost. For example, a typical grape pomace contains only about 3% or less tartaric acid on a wet basis. Processing a given weight of grape pomace containing this percentage of tartaric acid by batch methods resulted in a relatively low recovery of the tartrate values. Operating continuously on a like batch of material, the material was handled more economically and, at the same time, practically the entire tartaric acid content was recovered. In addition, I have found it possible to recover the ethyl alcohol content of the pomace as well as the tartrate content, the two operations supplementing one another, the alcohol removal facilitating subsequent recovery of the tartrate values.

Another distinct advantage of the present invention is that the pomace, after recovery of the alcohol and tartrate values, is rendered physically suitable for application as a fertilizer or as a cattle-feed material.

In general it is the broad objection of the invention to provide a process and a suitable apparatus for the continuous treatment of pomace to the end that recovery of the alcohol content of the pomace can be achieved together with recovery of the tartrate values while the remaining solid materials are rendered suitable for application as a fertilizer or for use as a cattle-feed material.

The invention includes other objects and features of advantage, some of which, together with the foregoing, will appear hereinafter wherein the present preferred process of this invention is disclosed.

In the drawing accompanying and forming a part hereof, the single figure in the drawing is a diagrammatic view illustrating apparatus. The process will be described in conjunction with operation of the apparatus.

In accordance with this invention I provide a normally closed chamber 6 generally extended horizontally. A hopper 7 is provided at one end of this chamber to receive pomace and feed it into the chamber. A screw conveyor flight generally indicated at 8 is provided within the chamber and is normally rotated to feed the material to the left-hand end of the figure in the drawing, the material being advanced continuously through the closed chamber, the hopper 7 being normally so filled with material that vapors cannot escape. Preferably the screw conveyor flight is hollow so that the mass undergoing the passage through the chamber can be heated by passing a hot fluid through the hollow conveyor flight. Such a conveyor is well known generally in the art and as typical of such a structure, reference is made to the Higbie Patent 192,069 of June 19, 1877.

At a plurality of points along the closed chamber, washwater is introduced through spray nozzles 9. The washwater is preferably heated to leach from the pomace alcohol contained herein. The washwater is drained off of the chamber through screens 11 and drains 12, the washwater being removed through a pipe 13 into a vessel 14 wherein it is collected for subsequent distillation. Any alcoholic vapors arising from the pomace in the chamber are collected in the header 15 and are removed through the pipe 16 to condenser 17. Liquid condensated in the condenser is removed through pipe 18 which is connected with pipe 13.

The substantially alcohol-free pomace passes downwardly through pipe 19 from the chamber 6. The end of pipe 19 is normally beneath the liquid level 20 in a trough 21 so that vapor escaping from the closed chamber is prevented. Trough 21 extends horizontally and is relatively deep so that pomace therein is subject to adequate contact with a suitable heated treatment solution. A suitable conveyor 22 is provided in the trough to move the pomace therein continuously through the trough and the solution therein. While this conveyor can take various forms, I have conveniently used a cleat conveyor. At the end of the trough opposite to the pomace inlet I provide an incline section generally indicated at 23. The cleat conveyor is adapted to move up this incline so that the treatment solution drains from the pomace. The liquid in the trough is preferably heated as by suitable steam jets (not shown). In addition, baffles (not shown) are placed in the trough to assure that the pomace remains in the trough for a sufficient length of time.

The incline portion 23 has a false screen bottom indicated at 24 over which the pomace is moved by the cleats of the conveyor which keep the screen open and the liquid drains freely. A pump indicated generally at 25 is provided. This pump has an inlet indicated at 26 placed at a suitable elevation on the trough, the pump drawing off excess treating solution adjacent the point of connection of the inclined portion 23.

A second cleat conveyor indicated at 31 is provided, this conveyor being placed in a position to receive the drained pomace discharged from conveyor 22 and move it along over a screen 35. A plurality of water sprays indicated at 32 are positioned to spray the drained pomace and to remove any tartrate solution adhering thereto. The washing conveyor 31 has a drain trough 33 below screen 35; a pipe 34 connected therewith drains the washwater into the trough 21 at the pomace inlet end. Adjacent the end of conveyor 31 several pressing rolls 36 are provided to remove excess liquid in the pomace. The pomace leaving the conveyor 31 is useful as a feeder fertilizer for it is well stabilized, free of alcohol, while the materials providing excess acidity therein, which made it objectionable as a feed and injurious as a fertilizer, have been removed.

The untreated pomace is preferably treated with a relatively dilute treatment solution, one lean in tartrates, as this hastens tartrate solution. The solution rate of the tartrates is relatively low; its concentration in the treatment solution is always relatively low in trough 21. By operating in the manner indicated, good recoveries are achieved.

The solution removed from the extraction trough can be used for the production of any desired tartrate material. The treatment solution itself can be of any desired composition. I have successfully used water containing a small amount of hydrochloric acid, but any other suitable leaching solution or a solvent can be employed instead. The solution is preferably heated to hasten extraction, a temperature between 90°–200° F. usually sufficing.

The term pomace or "fruit pomace" has been used herein and in the claims in a broad sense as applying not only to the usual grape pomace but to other materials such as lees or pomace derived from suitable fruits other than grapes as apples.

I claim:

1. A process for recovering tartrate values from a fruit pomace comprising moving a stream of pomace continuously over a path from a fresh pomace inlet to an extracted pomace outlet, passing a fresh tartrate value solvent stream countercurrent to that portion of said pomace advancing toward said pomace outlet, withdrawing said solvent stream from contact with said pomace stream at a point intermediate said pomace inlet and outlet, introducing said withdrawn stream at said fresh pomace inlet to pass along parallel flow with said pomace stream to adjacent said intermediate point, and withdrawing said stream from contact with said pomace adjacent said intermediate point as a source of tartrate values.

2. A process for recovering tartrate values from a fruit pomace comprising moving a stream of pomace continuously over a path from a fresh pomace inlet to an extracted pomace outlet, passing a fresh tartrate value solvent stream countercurrent to that portion of said pomace advancing toward said pomace outlet, withdrawing said solvent stream from contact with said pomace stream at a point intermediate said pomace inlet and outlet, introducing said withdrawn stream at said fresh pomace inlet to pass along parallel flow with said pomace stream to a point adjacent to but spaced from said intermediate point, withdrawing said stream from contact with said pomace adjacent said intermediate point as a source of tartrate values, separating solvent carried by said pomace between said intermediate point and said point of solvent withdrawal, and returning separated solvent to the solvent adjacent said withdrawal point.

ERNEST KURT METZNER.